United States Patent
Giove (10) Patent No.: US 10,989,328 B2
(45) Date of Patent: Apr. 27, 2021

(54) EROSION MONITORING SYSTEM

(71) Applicant: CCI Italy S.r.l., Milan (IT)

(72) Inventor: Fabio Giove, Gioia del Colle (IT)

(73) Assignee: CCI Italy S.r.l., Milan (IT)

(*) Notice: Subject to any disclaimer, the term of this patent is extended or adjusted under 35 U.S.C. 154(b) by 178 days.

(21) Appl. No.: 16/286,300

(22) Filed: Feb. 26, 2019

(65) Prior Publication Data
US 2019/0264832 A1    Aug. 29, 2019

(30) Foreign Application Priority Data
Feb. 26, 2018  (EP) .................................... 18158686

(51) Int. Cl.
| | |
|---|---|
| G01B 17/02 | (2006.01) |
| F16K 37/00 | (2006.01) |
| F16L 57/06 | (2006.01) |
| E21B 34/02 | (2006.01) |
| F16K 47/08 | (2006.01) |
| F16K 3/24 | (2006.01) |
| G01N 29/04 | (2006.01) |
| G01N 29/24 | (2006.01) |

(52) U.S. Cl.
CPC .......... *F16K 37/0083* (2013.01); *E21B 34/02* (2013.01); *F16K 3/246* (2013.01); *F16K 47/08* (2013.01); *F16L 57/06* (2013.01); *G01B 17/02* (2013.01); *G01N 29/04* (2013.01); *G01N 29/24* (2013.01); *G01N 2291/269* (2013.01)

(58) Field of Classification Search
CPC .......... G01B 7/06; G01B 15/02; G01B 17/02
See application file for complete search history.

(56) References Cited

U.S. PATENT DOCUMENTS

| | | | | | |
|---|---|---|---|---|---|
| 2,132,199 | A | * | 10/1938 | Yancey | E21B 34/02 166/76.1 |
| 4,558,716 | A | * | 12/1985 | Muchow | F16K 1/38 137/269 |
| 4,634,095 | A | * | 1/1987 | Taylor | F16K 47/04 137/625.37 |
| 4,735,229 | A | * | 4/1988 | Lancaster | E21B 34/02 137/312 |
| 5,706,856 | A | * | 1/1998 | Lancaster | F16K 47/08 137/556.3 |

(Continued)

FOREIGN PATENT DOCUMENTS

| | | | | |
|---|---|---|---|---|
| EP | 520567 A1 | * | 12/1992 | |
| JP | 61054406 A | * | 3/1986 | ............. G01B 17/02 |
| WO | WO-2019036453 A1 | * | 2/2019 | ............. G01N 29/07 |

*Primary Examiner* — David A. Rogers
(74) *Attorney, Agent, or Firm* — R. Ruschena Patent Agent, LLC (57) ABSTRACT

A system for monitoring the erosion of internal components of a valve having a valve (200, 300, 400) which in turn comprising a body (44, 17, 24), a trim (46, 19, 26) and a seat (21, 28, 48) and at least an ultrasonic probe (22, 40, 29) able to transmit ultrasonic waves through the internal components and receive waves reflection through. In this system, the gaps between the internal components of the valve are closed and the distances between them are almost equal to zero so that the continuity between components is able to transfer the waves determining therefore the distance between the ultrasonic probe (22, 40, 29) and the internal component to be monitored.

8 Claims, 8 Drawing Sheets

(56) References Cited

U.S. PATENT DOCUMENTS

| | | | | |
|---|---|---|---|---|
| 7,363,937 | B2* | 4/2008 | Suter | F16K 47/08 |
| | | | | 137/375 |
| 8,146,431 | B2* | 4/2012 | Yashan | G01N 29/449 |
| | | | | 73/643 |
| 8,365,601 | B2* | 2/2013 | Minachi | G01N 29/2468 |
| | | | | 73/602 |
| 10,139,222 | B2* | 11/2018 | Kroos | F16K 1/36 |
| 10,704,702 | B2* | 7/2020 | Al-Salam | E21B 34/025 |
| 2005/0115619 | A1* | 6/2005 | Kawulka | E21B 43/12 |
| | | | | 137/625.33 |
| 2014/0123767 | A1* | 5/2014 | Ao | G01N 29/2462 |
| | | | | 73/861.28 |
| 2016/0223089 | A1* | 8/2016 | Nijland | F16K 3/04 |
| 2019/0011055 | A1* | 1/2019 | Li | F16K 25/04 |
| 2019/0063427 | A1* | 2/2019 | Nowell | F16K 15/063 |
| 2020/0088306 | A1* | 3/2020 | Haro-Valdez | F16K 47/10 |

\* cited by examiner

EROSION MONITORING SYSTEM

BACKGROUND OF THE INVENTION

1. Field of the Invention

The present invention relates to an erosion monitoring system for internal components of control and on-off valves, that is capable of detecting the advancement of erosion during the operation of the valve. The erosion is due to the combined action of sand, gas, water and fluid speed inside the vanes of the valve. In particular, but not limited, the present invention relates to wellhead Choke valves configured to reduce the pressure from the wellhead to the oil or gas separator pressure, or in general to the chain of downstream processes that are dedicated to the separation, the scrubbing and the treatment of the produced fluids that are extracted from the ground.

2. Brief Description of the Prior Art

As it is known, choke valves and in general control valves are dedicated to the handling of dirty fluids like mixtures of oil, water and sand or compressible fluids (gases) with particles or droplets entering inside the dirty fluids. Such valves normally work upstream of the separation or purification processes and therefore are subject to severe and unpredictable erosion during the lifetime. The unpredicted erosion of the internal components is causing in general unpredicted shutdowns of the production plants, or, in extreme cases, the loss of containment of internal pressure (most of the times really high), with high prejudice to health and safety of local operators and also to environmental disasters, leading to leakage of oil or contaminated gas into the atmosphere.

In such cases, there are very few countermeasures, that can be used to avoid such catastrophic events. Normally, there is no possibility to detect the integrity of the body or, worse, the evolution of the erosion of internal components, that, if not detected on time, can lead to erosion of the pressure boundary of the valve.

Some known solutions provide, in the case the production well is placed in a remote place, the installation of leak detectors outside of the valve, which are able to capture the losses of fluids. For such installations, sniffers are normally used to detect the loss of Sulfuric Hydrogen. Unfortunately, this detection is only able to avoid high losses of fluids if there is an automatic system (High Integrity Protection System), which is able to cut the production flow from the ground. In any case, environmental pollution is still possible, but in the unlucky event that human beings are in the neighborhood, these unpredicted erosions might lead to injury or death. In the case the production well is located in a non-remote place and diagnostic instrumentation is available, as known solutions, there are some qualitative methods that are able to detect erosion of internal components, like plugs and trims. Some prediction methods are based on the comparison of the initial characterization of fluid capacity of the valve (along with the stroke of the valve) versus the actual fluid capacity of the valve in time.

The known methods can be, unfortunately, only qualitative and therefore cannot predict the exact remaining life of the valve, as the modified characteristic cannot be associated with a univocal morphology of erosion, nor can predict a proper time window in which the execution of a scheduled maintenance could avoid the case in which the erosion process is going too far. Also, the variation along the time of the fluid capacity of the valve is not able to detect if such erosion is affecting components located downstream of the trim restriction. These components can be the seat, the Venturi after the seat and the outlet flange of the valve.

Other known prediction methods are based on scheduled maintenance. The scheduled maintenance is based on statistical/historic methods, which requires the regular shutdown of the entire production plant at regular intervals. This maintenance approach, in the best of the cases, can lead to anticipated maintenance intervals, which lead to loss of production and increased costs of operation and loss of money, due to anticipated spare parts consumption. In this case, the valves are continuously refurbished at regular intervals. In the worst case, this maintenance is not able to predict correctly these intervals. This is due to the fact that statistics derived from different producing plants, are not always fitting to producing plants in different geographical areas, but sometimes also to the same field, as the sand production rate can be different also in adjacent production wells. Also, the evolution of the operating conditions in time is totally unpredictable, as the content of sand or water trapped in the fluid can dramatically vary a long with the time. This means that the calculated average interval times, that can be applied at the beginning of the life of the oil or gas well, can be completely different from those necessary at the end of well's life. Also the content of sand can be completely different even in the same field, between two different wells located sometimes very close to each other. All what above explained leads to uncertainty in maintenance planning and also to serious health and safety hazard.

Figure 1:
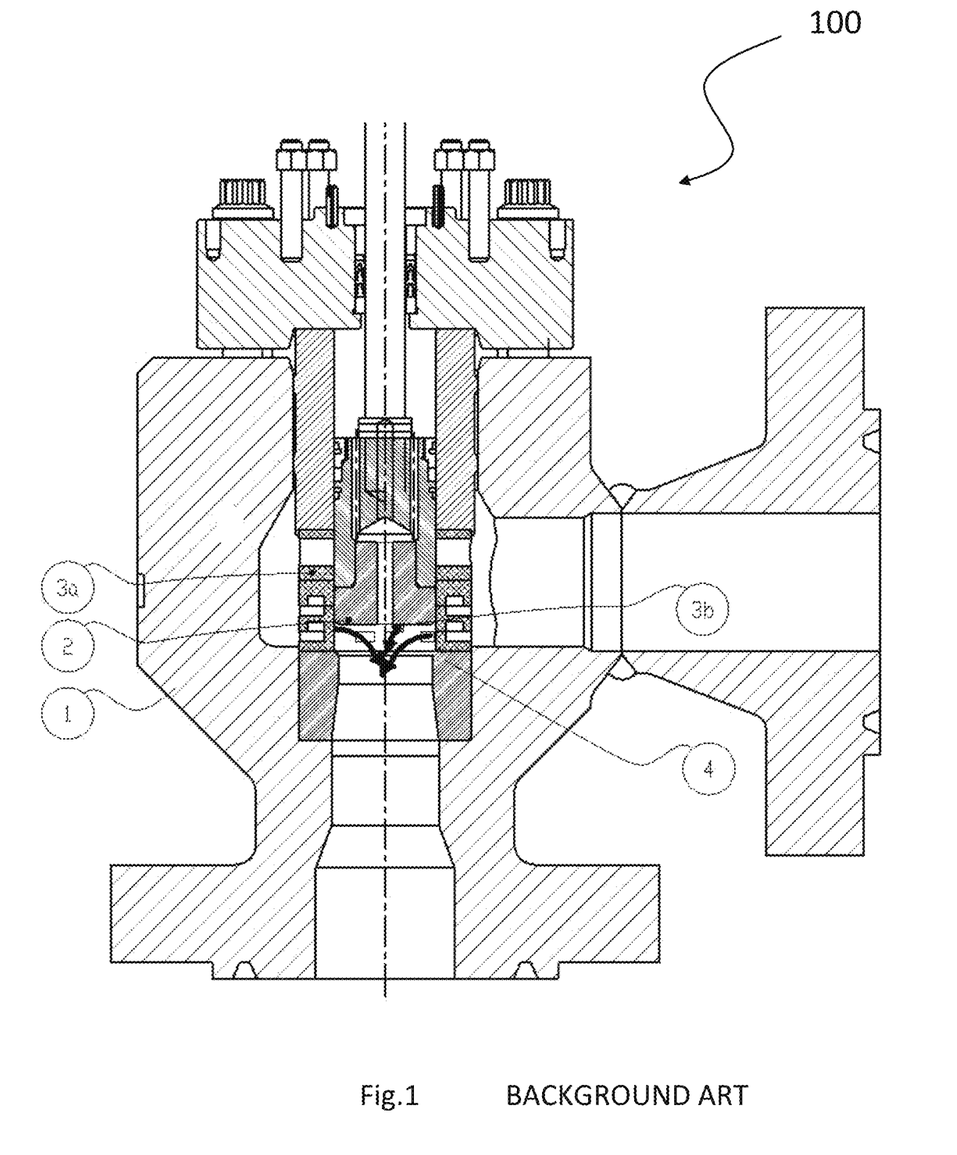
FIG. 1 shows a cross section of a wellhead Choke valve with "cage and plug" design, according to the background art.

As shown in FIG. 1, a known wellhead Choke valve 100 with "cage and plug" design is illustrated. The flow (arrows) is conveyed through a body 1 and controlled by a moving plug 2, which discovers flow ports 3b of a control element 3a or trim, cylindrically shaped. Flow ports 3b can be made by a simple straight or otherwise a tortuous path which reduced the speed of the flow jets.

The flow to be controlled is in general a mixture of Hydrocarbons and water, with entrained particles of sand, gravels or stones. The flow is entering in the valve from the right flange and by flowing inside a tortuous path engraved in the control element 3a, generally made in hard material, such as Tungsten Carbide, this is sent to outlet port of the valve (bottom flange), by flow ports 3b, opened or closed by the plug 2 in accordance to the required flow to be sent to the process. In the case of a Wellhead choke valve, the process is represented by a separator. The plug 2 is moved up and down by a stem operated by an electrical, hydraulic, pneumatic or mechanical actuator positioned on the top of the valve. During operation of the valve, the flow is gradually eroding the internals of the valve (generally the control element 3a, the seat 4 and the plug 2, in such a way that the flow ports 3b of the control element 3a and the plug 2 itself are allowing more flow to pass at a fixed position of the stroke of the stem of the valve 100.

This erosion is currently detected by instruments on the field (flowmeters, pressure gauges, temperature sensors), but this can't be used to identify the quantity of material eroded by the internal components of the valve. On the other hand, the operator has no other way to understand if and when the valve internals are going to be completely consumed with the time by such continuous erosive action.

Figure 2:
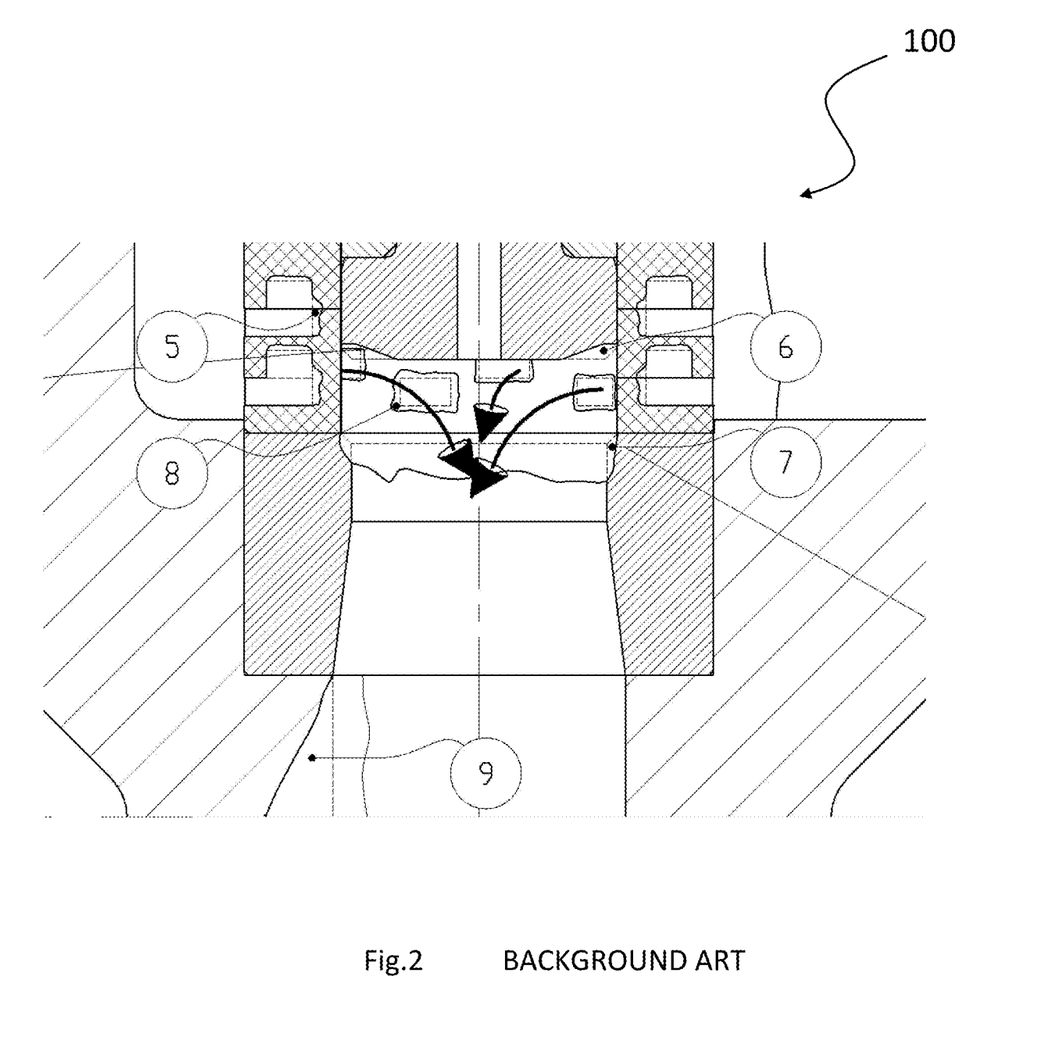
FIG. 2 shows a detail of FIG. 1, showing the evolution of erosion process during lifetime.

In FIG. 2 is represented a potential eroded configuration of valve internal components during the lifetime, compared to original configuration represented by dashed lines. The erosion portion 5 of tortuous flow paths is created by impact of high velocity fluid with particles (sand) entering onto the surfaces of the control element 3a. The fluid is also eroding the flow ports 3b of the control element enlarging the ports and realizing a modified shape. In FIG. 2 such enlarged flow ports are referenced with 8. Moreover, seat erosion portion 7 is not able to guarantee tight shutoff of the flow at full closed stroke of the plug 2. The plug itself can also present a plug erosion portion 6. The erosion process can attack also the body 1 with one or more body erosion portion 9 which reduces the minimum thickness of the pressure boundary with high risk of explosion and loss of fluid containment.

Figure 3:
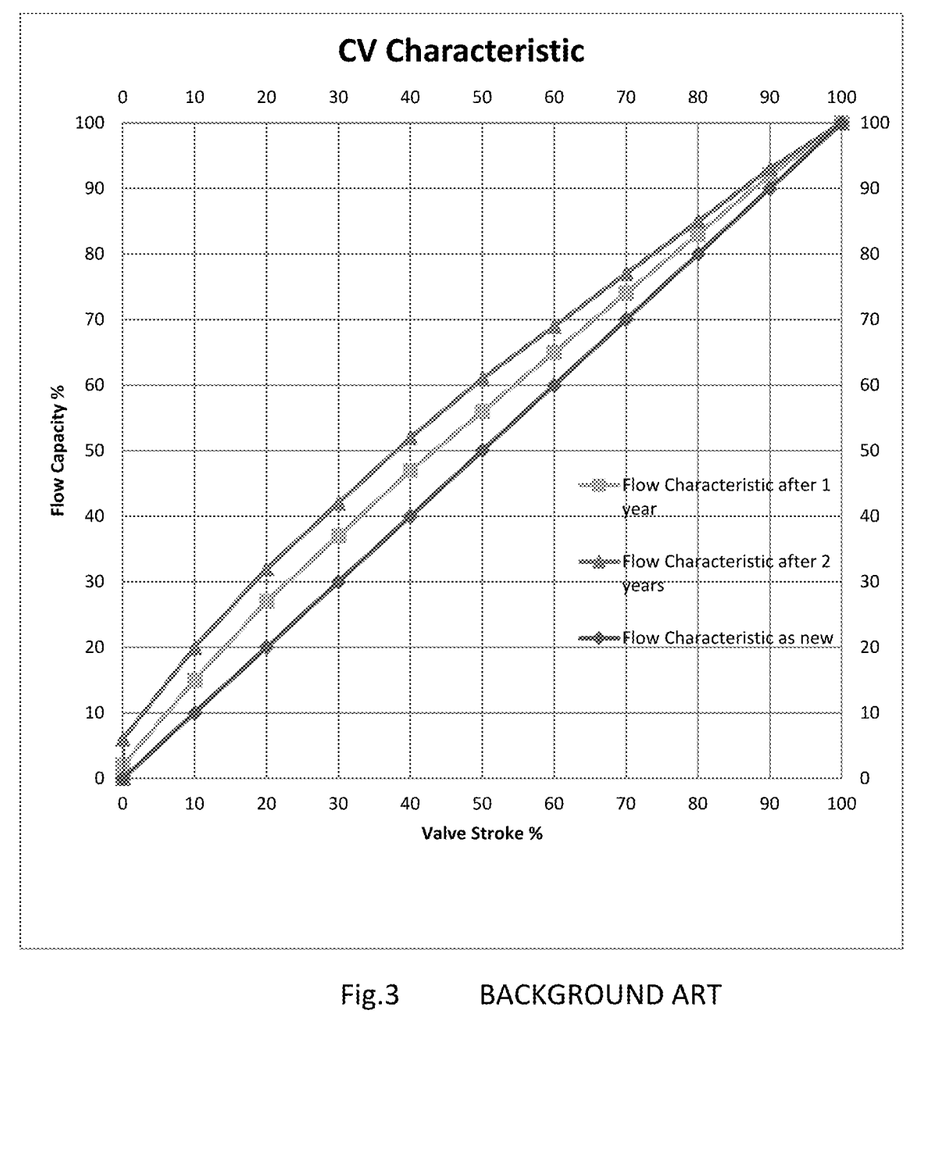
FIG. 3 shows a graph showing the behavior during lifetime of the valve characteristic curve, due to the erosion of internal components, such characteristic being measured according to the background art.

In FIG. 3, it is shown a graph of a known method for the estimation of the erosion during lifetime by flow characterization method of the trim. A typical valve parameter is called CV and represents the amount of flow (expressed in gallons per minute of water at a fixed pressure drop of 1 psi), that a valve is able to deliver in a completely open position. The characteristic of a valve is the characteristic CV the valve is able to deliver at partial open positions, i.e. as a function of the stroke. On a vertical axis there is the measure of the flow capacity of the valve in percentage, on the horizontal axis there is the measure of the valve stroke in percentage, as well. At 0% of the stroke, the leakage is increasing due to plug erosion portion 6 or seat erosion portion 7. At higher % of the stroke, the flow capacity increase can be due to either to seat erosion portion 7 and plug erosion portion 6 or trim (cage or multistage cage) erosion due to enlargement of flow passages, i.e erosion portion 5 of tortuous flow paths and enlarged flow ports 8. This information can represent a signal of occurrence of erosion, but it is not enough for operators to understand the exact moment, when it is required to maintain the valve and to replace plug, cage and seat. Also, some external factor may affect the exact calculation of the modified CV characteristics in time. These factors can be: the calibration of the stroke position of the valve, the modified fluid composition in time, that can hardly be detected in the moment when that particular flow is passing through the valve, the uncertainty in the logging of different pressure and temperature values upstream and downstream of the valve.

Ultrasonic sensors are nowadays used to monitor and check the thickness of piping, as a result of ultrasonic waves traveling into solid media and bouncing back when an obstacle is met by the wave. The obstacle is normally a defect of the material, or the inner face of the piping under measurement.

Figure 4:
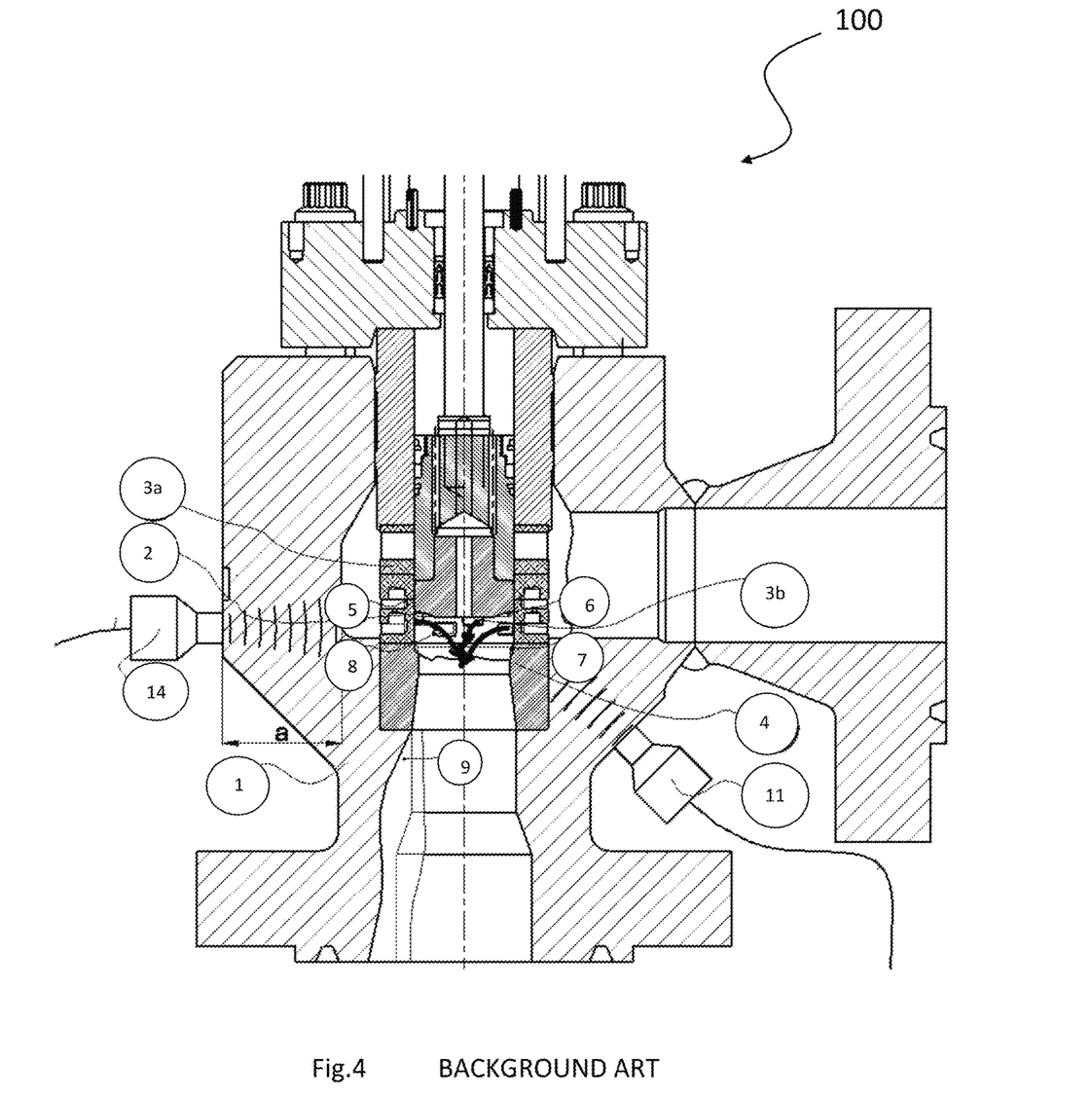
FIG. 4 shows an erosion monitoring system based on ultrasonic probes according to the background art.

Ultrasonic waves can't be used to check the integrity of internal components of the valves in general and Choke valves in particular, as there is no continuity between the body and the internal elements to be checked. The ultrasonic wave probe 11 in FIG. 4 is showing the current state of the art for measuring the thickness of the components of the valve. Ultrasonic probe 14 is able to transmit ultrasonic waves through the body 1 and receive waves reflection through and send signal to external unit through a cable. The reflected wave is received with a certain delay in time, depending on the distance "a" to be measured. The ultrasonic wave is normally reflected at inner wall of a pipe or a valve body and therefore is not able to capture erosion of inner elements of the valve, which are the control element 3a with flow ports 3b, eroded with final shape, i.e. enlarged flow ports 8; the plug 2 eroded with final shape, i.e. plug erosion portion 6; the seat 4 eroded with final shape, i.e. seat erosion portion 7. In particular, the ultrasonic probe 11 is not able to measure the seat erosion portion 7, as the ultrasonic wave is reflected at the gap between body 1 and seat 4. Ultrasonic wave by probe 14 is able to capture thickness "a", the internal and external surfaces are parallel, but ultrasonic probe 11 is not able to measure a precise distance, as the ultrasonic wave is not reflected by a surface which is parallel to the probe 11. The technology based on ultrasonic waves, used for the measure of erosion of pipes, is described in the patent application No. US2007193357 (A1). The use of this technology has never been applied to control valves, as the application of this technology has been considered in the past not suitable for valves.

Therefore, there is a need to obtain an innovative erosion monitoring system, based on a new ultrasonic wave technology able to overcome the drawbacks of the known systems.

SUMMARY OF THE INVENTION

A scope of the present invention is therefore an erosion monitoring system for any valve subject to fluid erosion, that is capable of detect the amount of material loss from the surfaces of internal components of the valve itself. The system is particularly suitable, but not limited, for valves exposed to high speed jets and high intensity vortexes, which can abrade part of material along the valve lifetime. This innovative erosion monitoring system presents the features as in the enclosed independent claim.

Further embodiments of the invention, preferred and/or particularly advantageous, are described according to the characteristics as in the enclosed dependent claims.

BRIEF DESCRIPTION OF THE DRAWINGS

The invention will be now described by reference to the enclosed drawings, which show some non-limitative embodiments, namely.

DETAILED DESCRIPTION OF THE PREFERRED EMBODIMENTS

According to the embodiments of the present application, and according to the FIGS. 5-8, there is a way to measure and detect the erosion of the seat of a valve (in particular a choke valve). The new erosion monitoring system is realized by a special design of the seat, which is closing the gaps between the body and the seat itself. This special design is based on one or more of the following approaches:

(a) mating conical surfaces. In other words the seat and the body have conical surfaces with similar angles, so that the seat is installed into the body with full contact area able to transmit waves;

(b) pressure fit mounted for concentric cylindrical surfaces. This means that the assembly process is realized by means of pressure from top and minimum interference gap;

(c) shrink fit mounted cylindrical surfaces. The assembly of the seat onto the body is realized by heating the body and allowing thermal expansion of the seat guiding area, in order to close the gap at cold operating condition;

(d) seat integral to the body;

(e) welding or brazing process.

Figure 5:
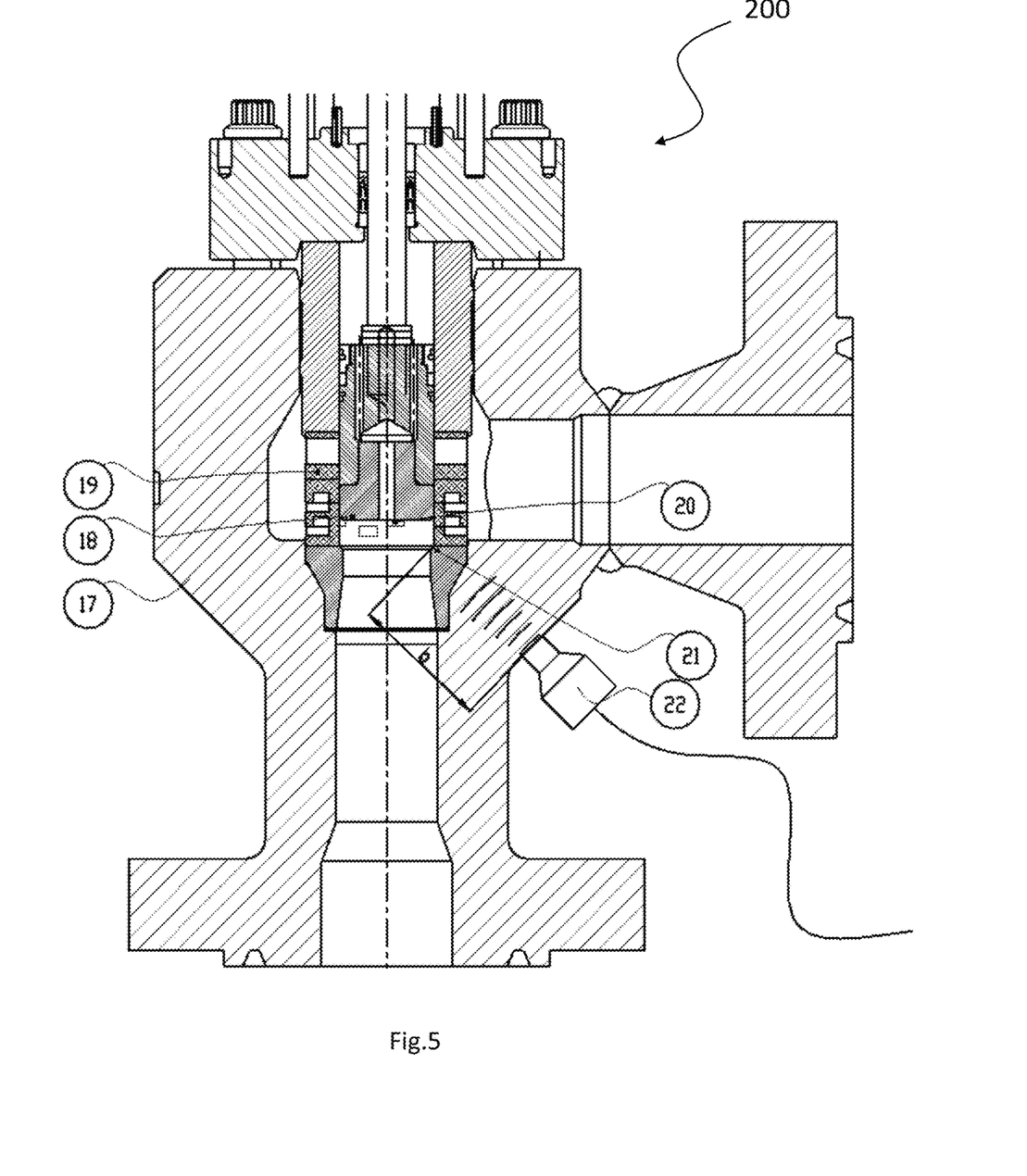
FIG. 5 shows a cross section of a wellhead Choke valve and a new erosion monitoring system based on ultrasonic waves according to an embodiment of the present invention.

In particular, the mating conical surfaces approach is represented in FIG. 5, according to a first embodiment of the invention.

In such a figure a valve 200 is shown and comprises a body 17, a plug 18, a control element or trim 19, flow ports 20 and a seat 21.

The continuity of the seat 21 and the body 17 assembly is shown. In fact, with respect to FIG. 4, the seat 21 has a wedge, which grants the continuity between body and seat and therefore this configuration is able to transfer the waves up to the tip of the seat 21, determining therefore, in a very precise way, the distance between the probe 22 and the potential area subject to erosion. In FIG. 5, this measure is indicated with the letter "b". Ultrasonic waves are traveling through different materials and reflected at the seat surface. The precision of the measure "b" is not extremely important, but it should be compared in time with the original measure, provided that the position and inclination of probe 22 is not modified along with the time. On this purpose, it must be used a proper support, or a simple machining of the body 17, able to mount the probe 22 and fix the mounting for the entire period of monitoring.

Figure 6:
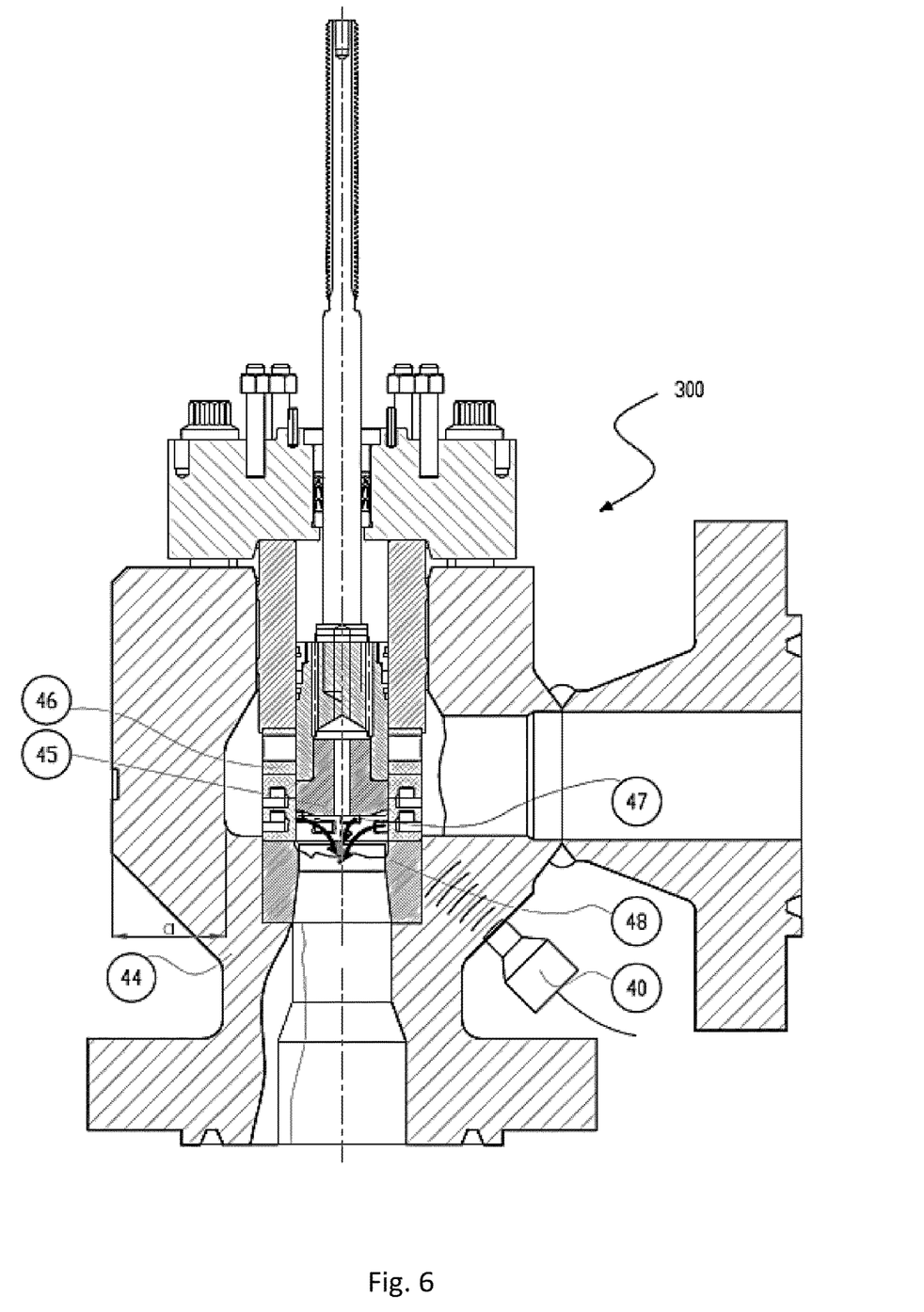
FIG. 6 shows a cross section of a wellhead Choke valve and a new erosion monitoring system based on ultrasonic waves according to a further embodiment of the present invention.

Another embodiment of the present invention, FIG. 6, shows a choke valve 300 in a configuration similar to that depicted in FIG. 4, where the outside diameter of the seat 48 is arranged in a cylindrical shape, but the inner diameter of the body 44 is machined with a smaller diameter. The valve comprising a body 44, a plug 45, a control element or trim 46, flow ports 47 and a seat 48. An ultrasonic probe 40 is located in the position as in FIG. 5.

The shrink fit assembly can be applied to the valve 300 where the outside diameter of the seat 48 is arranged in a cylindrical shape, but the inner diameter of the body 44 is machined with a smaller diameter. The assembly is therefore possible only because of thermal modification of one (or both) of the items 48 and 44 and in particular, by cooling the seat 48, or heating the body 44 to such an extent, that the outer diameter of item 48 is smaller than the inner diameter of item 44 in this transient thermal condition. The cold press fit consists in a similar process described in the above paragraph, but the compensation of the different diameters is obtained by the insertion of the seat 48 from the top cylindrical hole of the body 44 and pressed into position (like in FIG. 4) by the use of a hydraulic press, which elastically and also plastically deforms the components with a permanent hoop stress.

The welding process and the brazing assembly processes can be obtained in different ways, but all these processes are consisting in recovering the assembly gap between the seat and the body by filling it with additional material or by using electromagnetic welding to do it.

Figure 7:
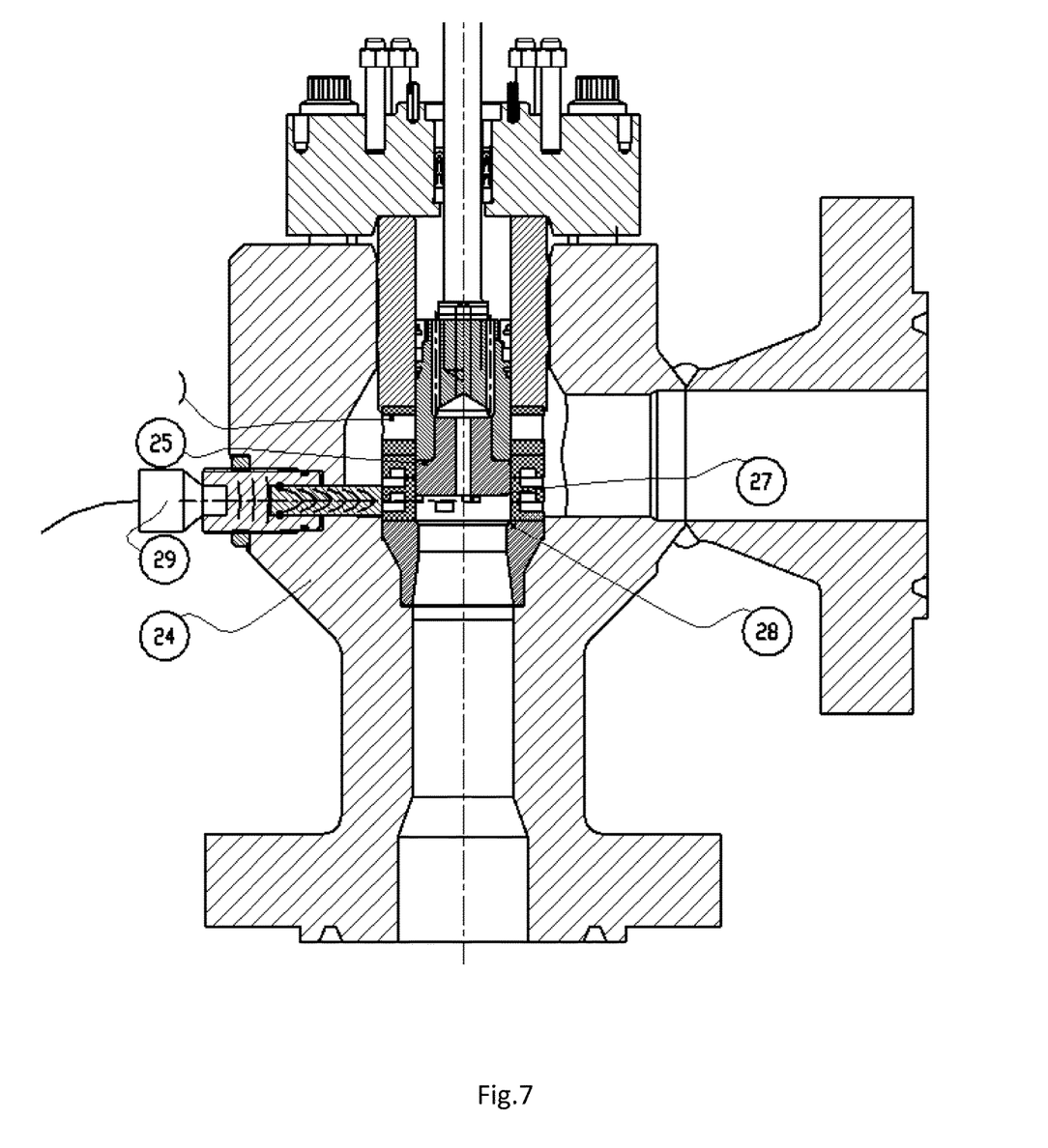
FIG. 7 shows a cross section of a choke valve and the new erosion monitoring system based on ultrasonic waves according to an alternative embodiment of the present invention.

Another embodiment of the present invention, FIG. 7, shows a choke valve 400 comprising a body 24, a plug 25, a control element or trim 26, flow ports 27 and a seat 28. The valve also comprises an ultrasonic probe 29 measuring the internal erosion of the trim 26 and in particular the enlarged flow ports 31. This is the part more subject to the erosive action of the controlled fluid inside of the valve, as this is the location, where the high speed and strong vortexes are converted into pressure losses. Therefore, trim 26 is normally the first component to be mostly modified by action of the flow. For this reason, it is more important to measure the erosion of the trim 26 and not the erosion of the plug 25. There are many reasons for being the trim 26 and not the plug 25 the most critical item.

Figure 8:
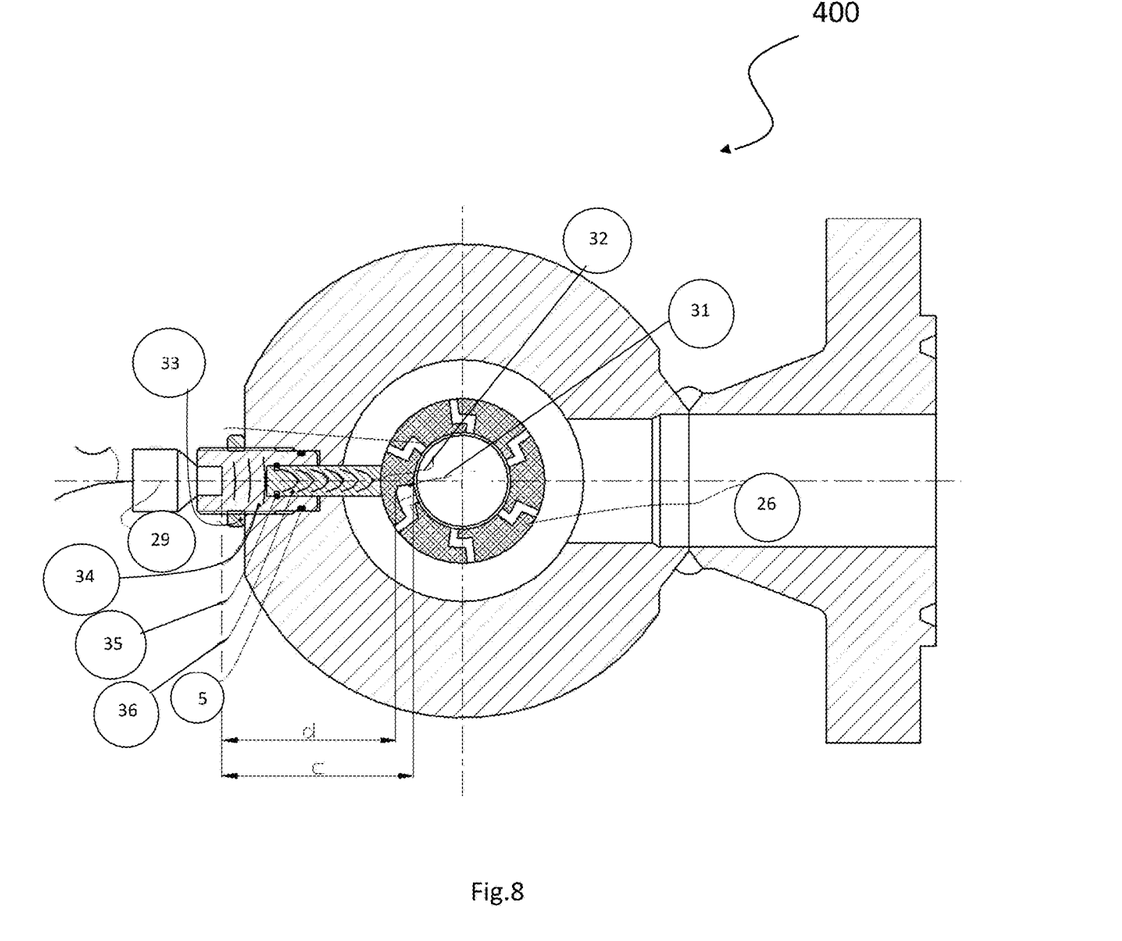
FIG. 8 shows a horizontal sectional view of the valve as in FIG. 6, and the new erosion monitoring system based on ultrasonic waves according to the embodiment of the present invention, as in FIG. 6.

One of these reason is that the wolfram carbide components (and in general ceramic materials) are more worn when impacted at angles around 90 degrees then when impacted at angles of about 45 degrees. Having the plug 25 a wedge with 45 degrees at the bottom (for seating purposes), then this has lower erosion rate factor than the 90 degrees angle of a sharp bend in the trim 26, as illustrated in FIG. 8. Another reason consists in the fact that the outlet speed of the flow at the cage is normally lower, than the speed at inlet and inside of the cage, due to expanding flow areas assigned at each pressure loss in the design of internal components. Also, the plug 25 has generally more stock material for erosion than the trim 26, therefore a premature failure of this last component is going to happen much faster than the first one. For the reasons mentioned above, it is therefore essential to control the evolution of the erosion path and advise the user by detection of distance "c", as shown in FIG. 8.

FIG. 8 is an horizontal sectional view of the valve represented in FIG. 7. From this view it can be seen the disk stack with sharp angle multistage trim 26. The trim 26 is just an example of the possible combinations of single and multistage configurations. Generally, the multistage trim is obtained by sharp angle curves that are responsible for local pressure loss of the fluid. Such sharp angle curves can be in the horizontal plane (like depicted in FIG. 7), or can also follow the vertical direction of the axis of the trim 26. In any case, it is always possible to position the probe assembly and, in particular, the distance compensator in a way that the erosion path is captured by the modified reflection of the ultrasonic waves, due to the change of internal shape of flow path in the trim 26. According to the embodiment of FIG. 7 and FIG. 8, the continuity for waves transfer through the valve is made by assembling the following components: a holder 34, a gasket 35 and a compensator 36, hold in place by a nut 33.

The difference in measurement "d–c" is an estimation of the entity of eroded material in time and is made by ultrasonic waves 32 reflection time detection.

The alignment of the trim 26 to the ultrasonic probe 29 can be done in different ways: an example is the use of alignment reference pins during assembly, between the compensator 36 and the trim 26. In FIG. 7 the compensator 36 is made with a cylindrical shape and a curved head mating the external radius of the trim 26. Another embodiment can be made by shaping the head of the compensator 36 with a flat surface and shape the trim 26 with a flattened spot, where the measurement is going to take place. In this case, the alignment does not require any pin and is completely automatic.

The compensator 36 can be supported by a holder 34, which is equipped with proper gaskets 5 to contain the pressure inside the valve body. In FIG. 7, the embodiment is represented by the use of O-Rings, but these might be replaced with any other radial gasket made of polymers, rubber, flexible metal or Graphite.

The holder 34 is fixed by a nut 33, to avoid that pressure and vibrations can un-screw the holder and therefore causing a false reading of the ultrasonic waves. The nut 33 can be also replaced by any other unscrewing mechanism, such as glues, applied on the screw between the valve body and the holder 34.

The probe 29 should be fixed in an appropriate position for the entire life of the trim, in order to compare the initial distance "c", as shown in FIG. 7 and the actual distance "d" at any time in valve life, as a result of the erosion mechanism of the fluid inside the valve. The position, the size, the number and the quality of the ultrasonic probes, as shown in figures attached to the present Patent application, are (of course) purely indicative, as these must be adapted to the need of the user, the type of the application, the model of the valve, etc. . . . . . It is therefore possible to put multiple sensing points to a valve, or use a single probe, which position is controlled by a positioning system and moved through multiple points of a valve. For example, the spot distance compensator 36 can be replaced by a longer compensator which covers the entire stroke of the valve and it is able to move vertically along different levels of trim 26 positions. In this way, the ultrasonic measurement calculated as a "spot reading" in a precise position, can be transformed into a full scan of the trim 26 for its entire length.

Even if at least an embodiment was described in the brief and detailed description, it is to be intended that there exist many other variants in the protection scope of the invention. Further, it is to be intended that said embodiment or embodiments described are only example and do not limit in any way the protection scope of the invention and its application or configurations. The brief and detailed description give instead the experts in the field a convenient guide to implement at least an embodiment, while it is to be intended that many variations of the function and elements assembly here described can be made without departing from the protection scope of the invention encompassed by the appended claims and/or technical/legal equivalents thereof.

The invention claimed is:

1. A system for monitoring erosion of internal components of a valve comprising a valve (200, 300, 400) which, in turn, comprises:

a body (44, 17, 24),
a trim (46, 19, 26),
a seat (21, 28, 48),
at least an ultrasonic probe (22, 40, 29) able to transmit ultrasonic waves through the internal components and receive waves reflection through;
wherein said system has gaps between the internal components of the valve that are considered closed, wherein distances between them are almost equal to zero, so that a continuity between components is able to transfer waves determining therefore a distance between said ultrasonic probe (22, 40, 29) and said internal component to be monitored;
and wherein said gaps between the body (44, 17, 24) and the trim (46, 19, 26) are closed by a compensator (36) mounted between the body (44, 17, 24) and the trim (46, 19, 26).

2. The system according to claim 1, wherein said gaps between the body (17, 24) and the seat (21, 28) are closed by mating conical surfaces of the body (17, 24) and conical surfaces of the seat (21, 28) which are reciprocally in contact.

3. The system according to claim 1, wherein said gaps between the body (44) and the seat (48) are closed by a pressure fit mounted for concentric cylindrical surfaces of the body (44) and the seat (48).

4. The system according to claim 1, wherein said gaps between the body (44) and the seat (48) are closed by shrink fit mounted cylindrical surfaces, and by heating the body and allowing thermal expansion of the seat guiding area.

5. The system according to claim 1, wherein said gaps between the body (44, 17, 24) and the seat (21, 28, 48) are closed by using a seat (21, 28, 48) integral to the body (44, 17, 24).

6. The system according to claim 1, wherein said gaps between the body (44, 17, 24) and the seat (21, 18, 48) are closed by welding or by a brazing process.

7. The system according to claim 1, wherein said compensator (36) has a cylindrical shape and has a curved head matching the external radius of the trim (46, 19, 26).

8. The system according to claim 1, wherein said compensator (36) has a head with a flat surface and the trim (46, 19, 26) has a flattened spot.

* * * * *